(12) United States Patent
Hollis

(10) Patent No.: US 7,374,185 B1
(45) Date of Patent: May 20, 2008

(54) BILEVEL, CANTILEVERED, ANGLED PLATFORM WELDING CART WITH CYLINDER RACK

(76) Inventor: Fred Borras Hollis, 34506 NW. 11 th Ave., La Center, WA (US) 98629

( * ) Notice: Subject to any disclaimer, the term of this patent is extended or adjusted under 35 U.S.C. 154(b) by 364 days.

(21) Appl. No.: 11/100,833

(22) Filed: Apr. 7, 2005

Related U.S. Application Data

(60) Provisional application No. 60/561,106, filed on Apr. 8, 2004.

(51) Int. Cl.
*B62B 3/00* (2006.01)
*B62B 1/00* (2006.01)
*B62B 5/00* (2006.01)

(52) U.S. Cl. ............................. 280/47.35; 280/47.34; 280/79.5; 280/638; 280/35; 280/79.11

(58) Field of Classification Search ............. 280/47.34, 280/47.35, 638, 35, 79.11, 79.5
See application file for complete search history.

(56) References Cited

U.S. PATENT DOCUMENTS

| | | | | |
|---|---|---|---|---|
| 6,059,127 | A * | 5/2000 | Bennett | 211/85.18 |
| 6,688,634 | B2 * | 2/2004 | Noffsinger | 280/651 |
| 6,746,029 | B2 * | 6/2004 | Chu et al. | 280/47.35 |
| 6,966,574 | B1 * | 11/2005 | Dahl | 280/651 |
| 7,114,732 | B1 * | 10/2006 | Ismail | 280/47.34 |
| 2003/0155730 | A1 * | 8/2003 | Chu et al. | 280/47.35 |
| 2006/0119059 | A1 * | 6/2006 | O'Connor | 280/47.35 |

\* cited by examiner

*Primary Examiner*—Christopher Ellis
*Assistant Examiner*—John R Olszewski
(74) *Attorney, Agent, or Firm*—Mark S. Hubert

(57) ABSTRACT

The present invention is a bilevel, cantilevered, welding cart with a rear cylinder rack and angled top platform. The cart frame is of a one piece heavy gauge steel that is capable of transporting in excess of 600 pounds. The front caster wheels and rear axle are welded to the frame leaving only the rear wheels to be attached. It has a single rear pillar support that can be offset in front of the gas cylinder support to allow easy connection of the gas, water air and or power lines to the welding unit. The gas cylinder support positions the weight of the gas cylinder adjacent the rear axle to prevent tipping.

8 Claims, 6 Drawing Sheets

BILEVEL, CANTILEVERED, ANGLED PLATFORM WELDING CART WITH CYLINDER RACK

BACKGROUND OF THE INVENTION

The present invention relates to a extremely heavy-duty welding cart and more particularly to an improved welding cart designed for use in industrial environments.

Although rolling welding carts are commonplace in industrial and commercial welding environments, generally, these are multipurpose carts that have been adapted to carry heavy welding units and the associated equipment. These adapted carts have several drawbacks. First, they are generally of a mechanical fastener assembled, light gauge steel fabrication and as such have load limits that are marginal for their intended use. Second, the support pillars on two-tiered welding units tend to obstruct and hamper the attachment of the gas, water and electrical line connections to the rear of the welding units. Third, these modified carts, do not roll well in the terrain encountered in the industrial welding environment and is such are prone to tipping and sudden stops. Lastly, the addition of gas cylinders to the welding cart alters the cart's center of balance and makes the cart dangerous to move.

The steel members in the prior art carts are commonly, hollow, tubular or bent steel to add structural strength to the light gauge of steel used. Often these light-duty carts buckle or distort under the weight of heavier welding units. Similarly, the wheels commonly break or fail to roll smoothly under such heavy weights. Although these welding carts are intended to transport welding units and the along smooth floors, smooth floors are commonly, not the case. The art of welding requires the use of numerous paraphernalia, most of it heavy. Such paraphernalia includes hoses, helmets gloves, welding rod, metal gas cylinders, grinders, magnets, clamps and metal to name a few. The welding carts rarely carry, only the welding units. The wheels of such units are generally susceptible to damage from the floor they roll on. Most commercial or industrial welding shops have poured cement floors with divots, loose debris or thermal breaks therein. The combination of heavy loads and an uneven rolling surface leads to the premature failure of the cart wheels and the creation of potentially dangerous situations.

A secondary problem is caused by the direct overhead lighting of most industrial and commercial welding facilities. This type of lighting, tends to cast shadows on the controls of the face of the welding units. This makes selection of the welding parameters difficult to accomplish. This is a constant problem since often small incremental changes in these settings are necessary to facilitate proper welds.

This new cart overcomes the disadvantages of the existing prior art by incorporating a single piece cart frame that is fabricated from heavy gauge structural steel; utilizing large diameter pneumatic wheels and heavy-duty castor wheels solidly secured to the cart frame; angling the second level platform; adding a securement means for individual manufacturer's welding units; adding a gas cylinder platform, gas cylinder stabilizing plate and securing chain; having a single pillar support design that allows open access to the bottom levels; and incorporating side hangers for welding hoses and paraphernalia. The overall design and placement of the support pillar places the cart weight directly over the rear axle therein stabilizing the cart and preventing accidental tipping.

Henceforth, such a heavy-duty welding cart designed for use in an industrial setting would fulfill a long felt need in industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a heavy-duty welding cart designed for use in industrial setting that is able to safely transport 600 pounds of welding related equipment, while providing a margin of safety against tipping henceforth unseen in the industry.

It has many of the advantages mentioned heretofore and many novel features that result in a new welding cart which is not anticipated, rendered obvious, suggested, or even implied by any of the prior art, either alone or in any combination thereof.

In accordance with the invention, an object of the present invention is to provide an improved welding cart capable of smoothly transporting up to 600 pounds of welding related equipment across the terrain of an industrial facility.

It is another object of this invention to provide an improved welding cart that allows easy access to all items on and around the cart as well as the gas, water and electrical connections.

It is a further object of this invention to provide a welding cart that offers increased visibility of the controls on the welding unit in industrial lighting situations, and to allow ample room for the connection of service lines to the rear of the welding units.

It is still a further object of his intention to provide for a welding cart adapted to safely transport multiple gas cylinders.

It is yet a further object of this invention to provide a do-it-yourself kit form from which welders can fabricate their own heavy-duty welding cart.

It is yet a last object of this invention to provide a platform height adjustable, heavy duty, one piece frame welding cart.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

The present invention relates to a bi level welding cart, designed to safely transport gas cylinders, having a one piece welded steel frame utilizing a single pillar design and an upward angled second platform. The structural configuration is such that the weight of any gas cylinders and that of any equipment on the top platform are centered directly over the rear axle to minimize tipping. A gas cylinder is secured by a chain long enough to substantially encircle the cylinder and mechanically connected at two points to a cylinder securing plate. The rear wheels are of a large pneumatic style while the front wheels are of a larger swivel castor design. The cart frame is of a one piece steel welded design of a minium 3/16 inch thick steel that can be factory assembled or site assembled. The main support pillar can be offset and/or can be of a telescoping and pivoting design.

Figure 1:
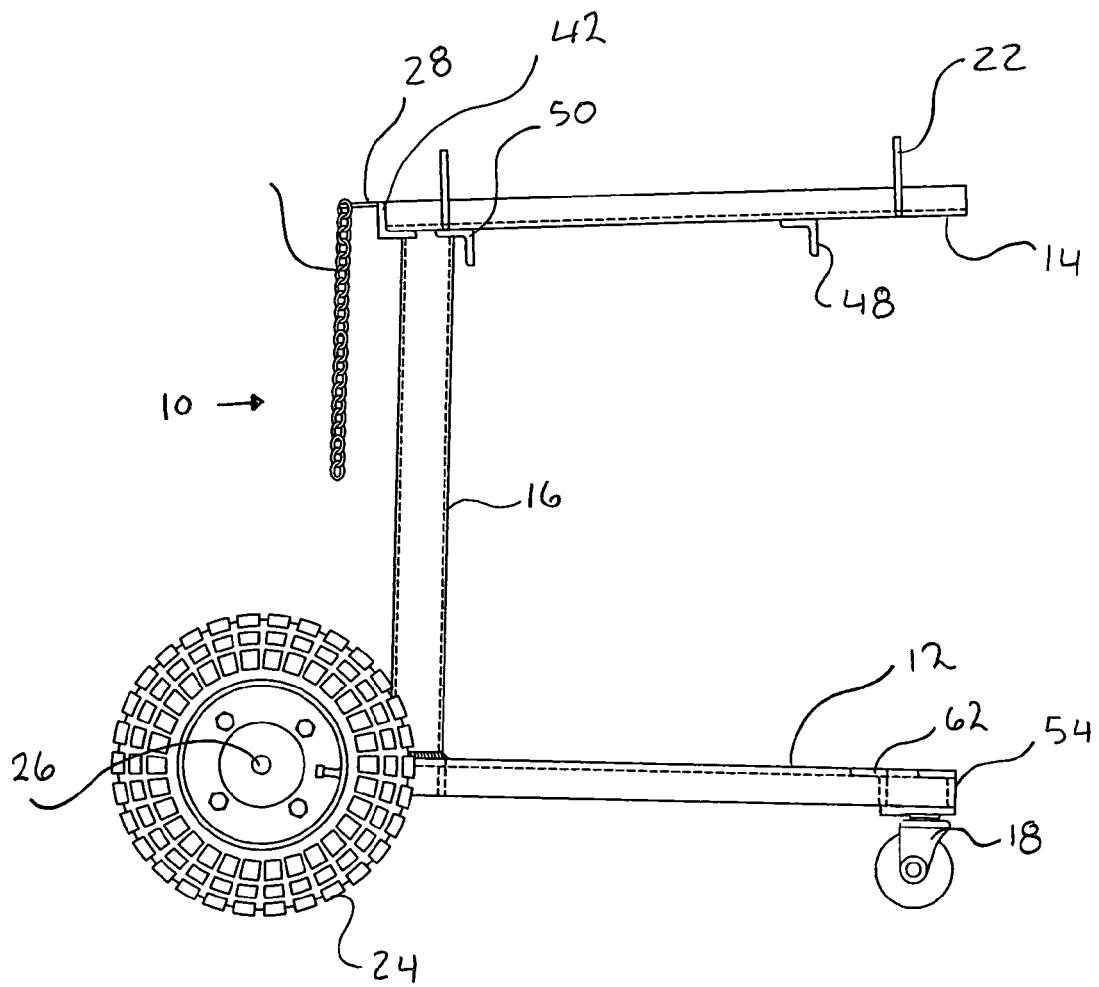
FIG. 1 is a side view of the general arrangement of the preferred embodiment cart.

Referring now to FIG. 1, a side view of the preferred embodiment cart 10, the general arrangement of all components can be seen. Upper platform 14 is held in a spaced and angle configuration from lower platform 12 by welded construction with pillar 16. The castor plates 20 of front casters 18 are welded to front end lower member 54 and first lower cross member 62. Pneumatic tire 24 is rotatably coupled to rear axle 26. Hooks 22 extend normally from upper platform 14 as does cylinder lock plate 28. Chain 70 is affixed permanently to one end of cylinder lock plate 28. First upper cross member 48 resides parallel to the other upper cross members and is situated along the length of the upper members so as to coincide with the bottom feet of a specific manufacturer's welding unit. The second upper cross member 50 and rear and upper member 42 are welded to the top end of pillar 16. The bottom of pillar 16 is welded to lower channel cross member 64. Lower platform 12 and upper platform 14 are not parallel. Upper platform 14 is fixed at an angle between 2° and 5° inclined from the horizontal surface of lower platform 12.

Figure 2:
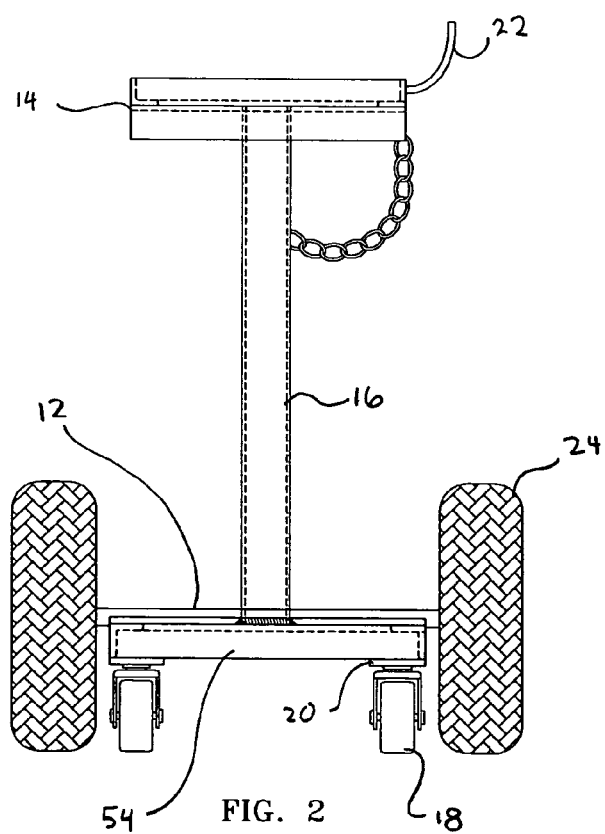
FIG. 2 is a front view of the preferred embodiment cart.

Referring now to FIG. 2, a front view of the preferred embodiment cart 10, front end lower member 54 can be seen as welded to castor plate 20. The central location of pillar 16 with respect to the width of upper platform 14 end lower platform 12 is illustrated. Hooks 22, may range in number from one to four and are located along the side upper members of upper platform 12. Caster wheels 18 pivot to steer about the midpoint of castor plate 20.

Figure 3:
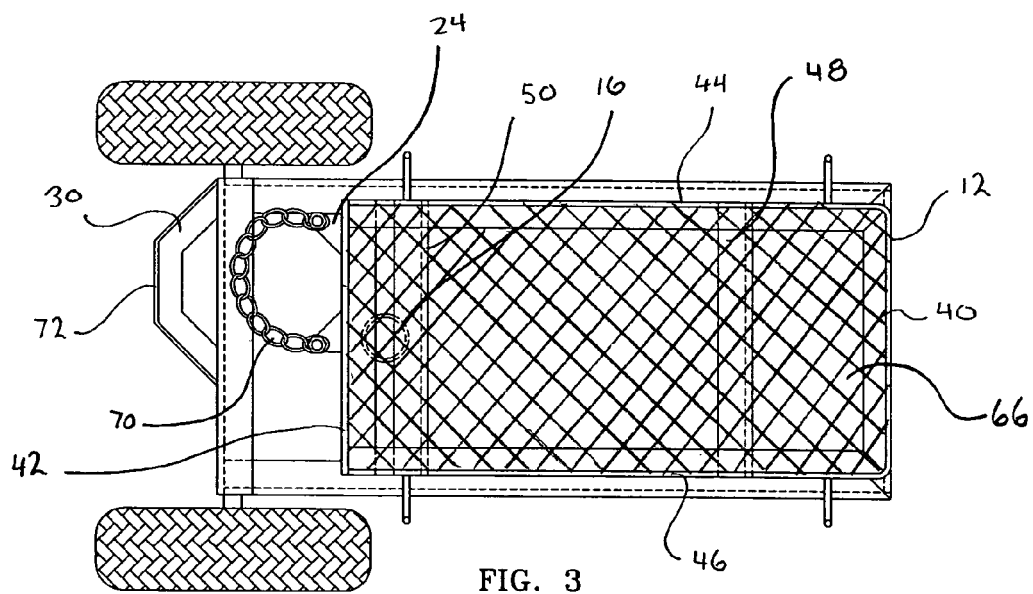
FIG. 3 is a top view of the general arrangement of the preferred embodiment cart.

FIG. 3 illustrates a top view of the preferred embodiment cart 10 wherein the general arrangement of the cylinder lock plate 28, cylinder chain 70 and cylinder platform 30 can be seen. These components are not centered with respect to the width of cart 10. Rather they are offset with respect to the longitudinal axis of cart 10 so as to allow easy connection of gas, air, water and power lines to any welding unit. Cylinder platform 30 is welded to rear end lower member 56 and is made of angle iron having retaining lip 72 on its periphery, so as to prevent a cylinder from sliding off of the platform. The midpoint of cylinder platform 30 resides directly above rear axle 26 thereby distributing the cylinder weight evenly across the larger rear pneumatic tires 24 and minimizing the possibility of tipping. In alternate embodiments the cylinder platform may be lowered in a closer proximity to the floor such that the unloading and offloading of heavier cylinders would be greatly simplified. This is extremely handy when handling industrial theater pound gas cylinders.

Upper platform 12 is constructed from the rectangular welded arrangement of front end upper member 40 and rear end upper member 42 to first side upper member 44 and second side upper member 46. All four of these members are oriented so as to form an internal lip around the enclosed boundaries of upper platform 12. The second upper cross member 50 and rear end upper member 42 are welded to the top end of pillar 16. First upper cross member 48 is positioned so as to receive the front feet of a welding unit when the rear feet of the welding unit are positioned on second upper cross member 50 and rear end upper member 42. All members and cross members of the upper platform are made of 1.5 inch dimensioned angle steel having a thickness of 3/16 inch or greater.

Figure 4:
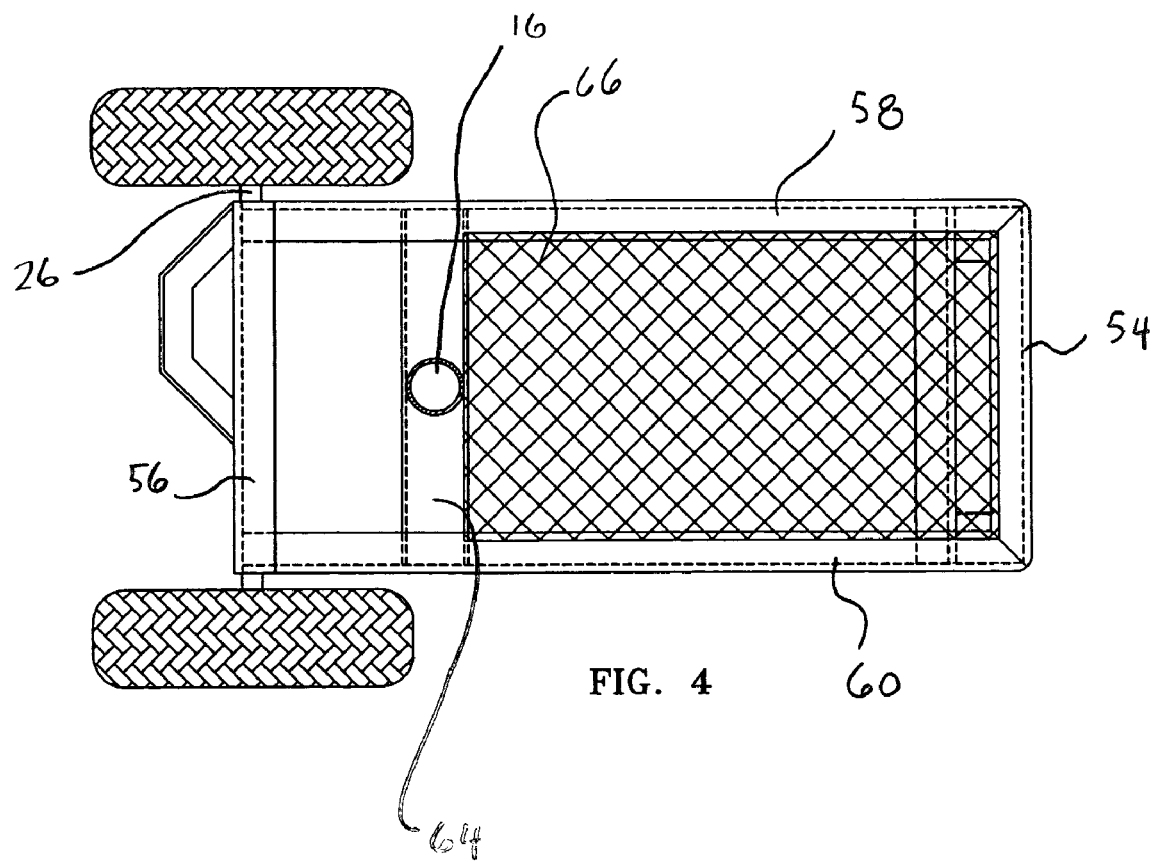
FIG. 4 is a top view of the preferred embodiment cart taken as a horizontal cross sectional through the support pillar therein showing an optional bottom platform grating.

Looking at FIG. 4, a top view of the preferred embodiment cart taken as a horizontal cross sectional through the support pillar, it can be seen that lower platform 14 is constructed from the rectangular welded arrangement of front end lower member 54 rear end lower member 56 side lower member 58 and second side lower member 60. The bottom end of pillar 16 is welded onto lower channel cross member 64, which is positioned approximately one quarter of the distance between rear end lower member 56 and front end lower member 54 and resides parallel to both lower members. Rear axle 26 is welded on to rear lower member 56 and extends through orifices in first side lower member 58 and second side lower member 60. In this way the weight of the upper platform 12 is directly transmitted to, and centered over the rear axle 26. Optional grate 66 is seen residing on front end lower member 54 lower channel cross member 64 first side lower member 58 and second side lower member 60.

Figure 5:
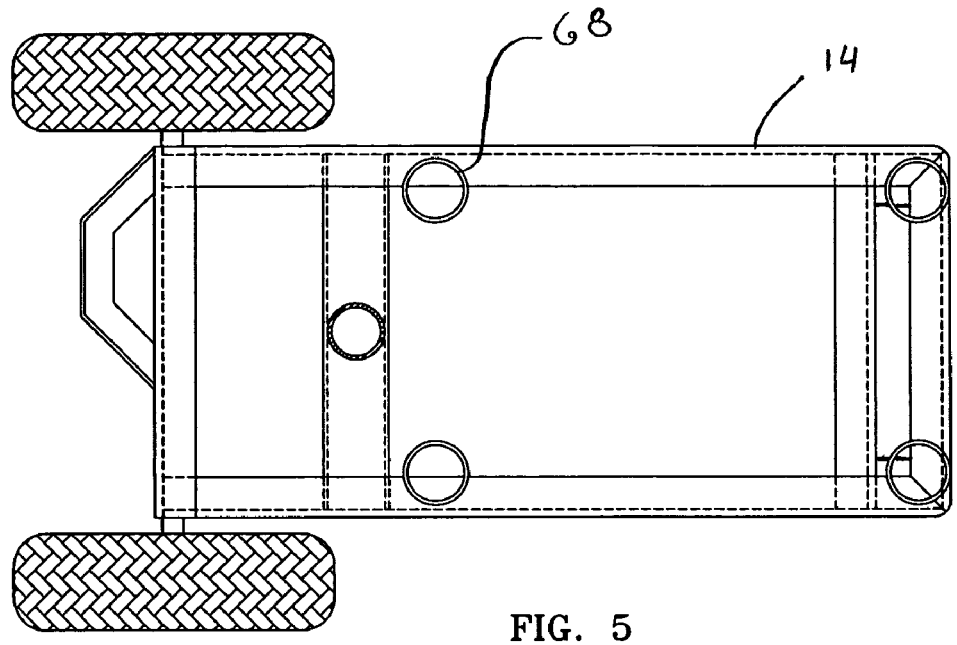
FIG. 5 is a top view of the preferred embodiment cart taken as a horizontal cross sectional through the support pillar therein showing the optional welding unit feet cups.

Looking at FIG. 5, a top view of the preferred embodiment cart taken as a horizontal cross sectional through the support pillar 16, the four optional welding unit feet cups 68 can be seeing welded about the interior of lower platform 14. These cups 68 are horizontal sections of steel pipe size to accept and retain the feet of a specific welding manufacture's welding unit. The placement of cups 68 is specific to the welding unit to be utilized with the cart 10, and may be welded in situ by the purchaser of the cart 10.

Figure 6:
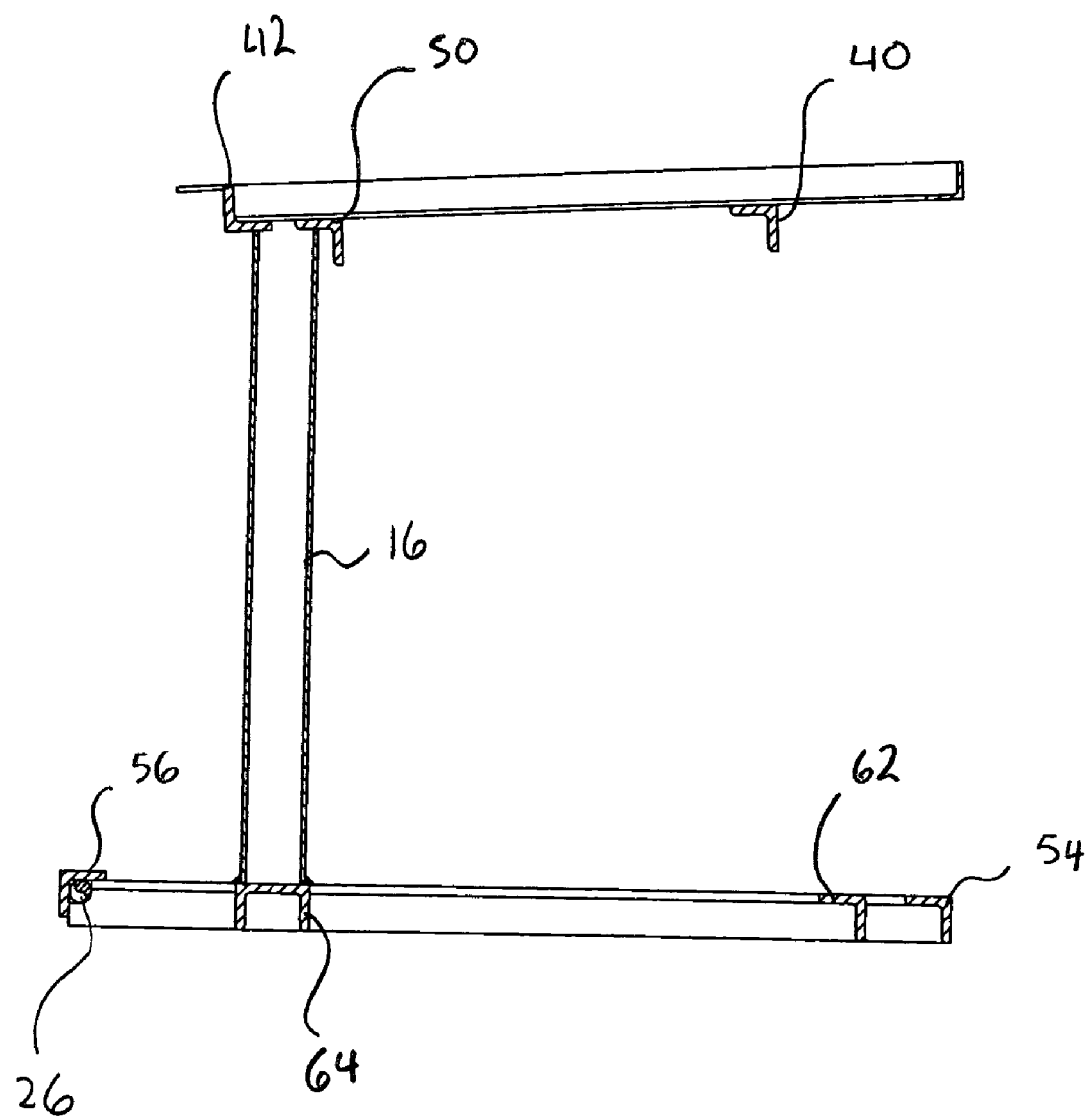
FIG. 6 is a side view of the preferred embodiment cart frame without the wheels attached.

FIG. 6 is a side view of the first preferred embodiment cart frame 79 without wheels attached, illustrating the general arrangement of all steel members. The spatial orientation of angle steel front end member 40 and angle steel second upper cross member 50 is such to allow contact with the feet of a welding unit so that the welding unit resides on the upper platform 12 with the same 2° to 5° inclined angle as the upper platform 12 has with respect to lower platform 14. Rear end lower member 56 has axle 26 welded thereto. The end lower member 54 and first lower cross member 62 are spaced so as to allow the welded connection of castor plate 22 to lower platform 14 therein stabilizing castor wheel 18. The bottom end of pillar 16 is welded about lower channel cross member 64, while the top end of pillar 16 is welded about second upper cross member 50 and rear end upper member 42.

Figure 7:
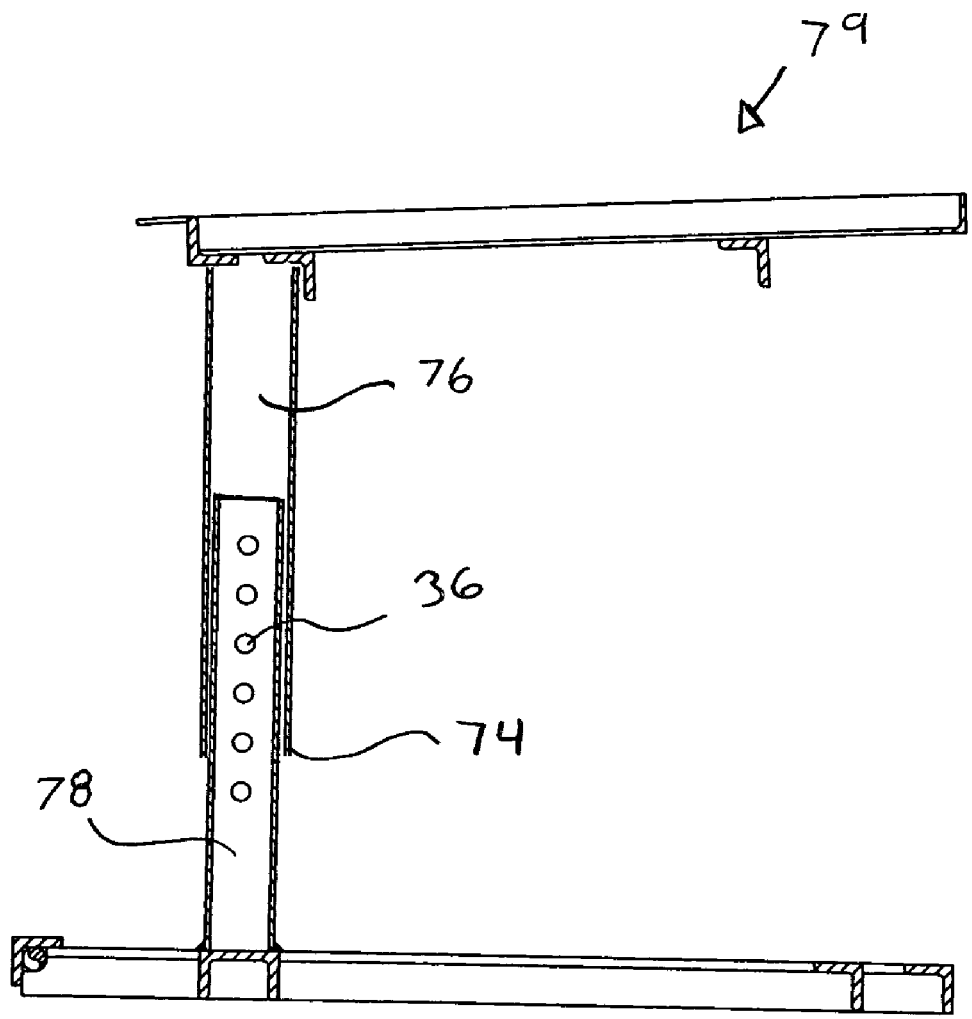
FIG. 7 is a side view of the first alternate embodiment cart frame without the wheels attached.

FIG. 7 illustrates a side view of the first alternate embodiment cart frame 79 showing the adjustable pillar 74. Pillar 74, is comprised of the telescoping arrangement between upper pillar 76 and lower pillar 78. The outer diameter of lower pillar 78 is dimensionally smaller than the inner diameter of upper pillar 76 such that there is enough tolerance to accommodate a snug, but sliding engageable engagement. Both the upper pillar 76 and lower pillar 78 have orifices 36 thereon that can be aligned and through which a mechanical fastener may pass to lock the positions of these pillars relative to each other. This adjustment allows both for a lower profile when transporting the cart and for upper platform 12 to be height adjusted to suit individual welders. It is well-known in the art that the mechanical faster, may be a nut and bold arrangement, a pin, shaft, or substantially similar device. The orifices 36, need not be vertically aligned on both upper pillar 76 and lower pillar 78. By adjusting the angular placement of orifices 36 about either pillar would allow the horizontal longitudinal axes of upper platform 12 and lower platform 14 to diverge at an angle.

Figure 8:
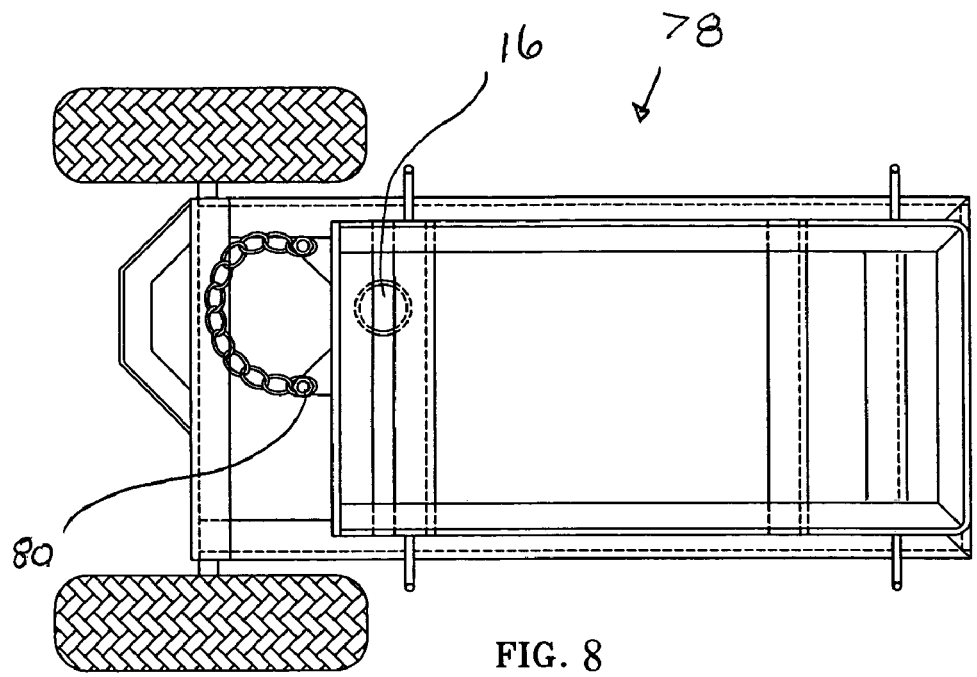
FIG. 8 is a top view of the second alternate embodiment cart.
Figure 9:
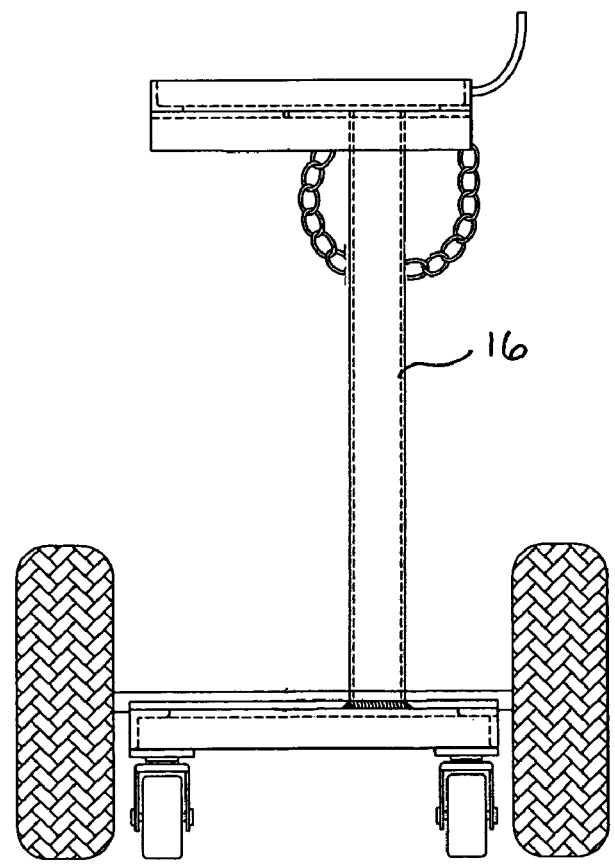
FIG. 9 is a front view of the second alternate embodiment cart.

FIG. 8 and FIG. 9 together illustrate the second alternate embodiment cart 78. This cart differs from the preferred embodiment cart only by the offset placement of pillar 16. This offset placement is preferable to access the rear connections on certain manufacture's welded units. Since this is an all welded minimum 3/16 inch steel construction. The rigidity of upper platform 12 is not really compromised.

The wheels of the cart are selected so as to allow smooth rolling and easy turning while traveling across uneven terrain. The rear tires 24 which are rotatably coupled to rigidly affixed rear axle 26 are of a design and diameter to support the heavy loads anticipated. The pneumatic aspect allows for the user to increase higher pressure to reduce rolling friction when moving excessively heavy loads. The preferred embodiment uses four inch wide by 10 inch high pneumatic tires rated in excess of 600 pounds in the configurations as illustrated. The tire's wide footprint helps to also distribute the load and minimize tipping. The front castor wheels 18 are double race pivoting casters having a width of 1.5 inches and a height of 3 inches. The front castor wheel plate 20 is fabricated from metal and is welded at each of its corners to lower platform 14. The castor wheels 20 were selected for their ability to roll smoothly and navigate through debris conditions without jamming.

The unit is adapted for individual user configuration for the welding equipment intended to be placed on the cart 10. The placement of the four optional welding unit feet cups 68 and first upper cross member 48 will be determined by the size of the welding units. When desired grating 66 or planar substrates may be added to either of the platforms.

The preferred embodiment cart uses 1.5 inch angle iron for most of its construction. All steel except the rear axle is 3/16" thick. This will allow a 600 pound capacity rating. Thicker steel, (i.e. 1/4 inch and above the) will result in a cart with a substantially increased load capacity. The rear axle is a 5/8 inch steel rod. The loose end of chain 71, once strapped securely around the cylinder can be secured to cylinder lock plate 28 by any one of a plethora of mechanical fasteners 80. Although the embodiments illustrated depict a single gas cylinder support arrangement, the mere mechanical adaptation of affixing a second identical cylinder lock plate 28 to upper platform 12 and a larger cylinder plate to lower platform 14 would allow for a second gas cylinder support arrangement therein. Since the longitudinal centerline of any gas cylinder would reside directly above the rear axle and centered within the footprint of the pneumatic tires 24, the addition of a second cylinder would not unbalance cart 10 enough to alter the steering or cause potential instability problems.

It is designed to be sold as a kit form to do it yourself welders, however this kit form is still to be weld assembled.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed.

Having thus described the invention, what is claimed as new and desired to be secured by Letters Patent is as follows:

1. A bilevel, cantilevered platform, steel welding cart having a one piece welded frame capable of supporting at least 600 pounds comprising:
   a lower, generally planar platform having an outer, peripheral lip;
   an upper, generally planar platform having an outer, peripheral lip,
   a single telescoping support pillar having an upper and lower end, and holding said upper platform in an angled, spaced configuration with respect to said lower platform;
   at least one rear gas cylinder support plate;
   at least one rear gas cylinder stabilizing plate;
   at least one gas cylinder retaining chain;
   two rear pneumatic tire wheels;
   a rear wheel axle; and
   two front caster wheels having a metal caster mounting plate, wherein said upper platform comprises a rectangular frame having a front and rear end upper member and a first and second side upper member made from at least 3/16 of an inch thick angle steel, and having a first angle steel upper crossmember adapted for welded connection between said first and second side upper members so as to be adjacent and in a substantially parallel and spaced configuration with said rear end upper member, and wherein said first angle steel upper crossmember and said rear end upper member are welded about an outer periphery of said upper end of said support pillar so as to maintain said upper platform at an angle between 1 and 10 degrees in relation to said lower platform, and wherein a generally planar steel grating is welded to said first and second side upper members so as to form a support surface.

2. A bilevel, cantilevered platform, steel welding cart having a one piece welded frame capable of supporting at least 600 pounds comprising:
   a lower, generally planar platform having an outer, peripheral lip;
   an upper, generally planar platform having an outer, peripheral lip,
   a single telescoping support pillar having an upper and lower end, and holding said upper platform in an angled, spaced configuration with respect to said lower platform;
   at least one rear gas cylinder support plate;
   at least one rear gas cylinder stabilizing plate;
   at least one gas cylinder retaining chain;
   two rear pneumatic tire wheels;
   a rear wheel axle; and
   two front caster wheels having a metal caster mounting plate wherein said upper platform comprises a rectangular frame having a front and rear end upper member and a first and second side upper member made from at least 3/16 of an inch thick angle steel, and having a first angle steel upper crossmember adapted for welded connection between said first and second side upper members so as to be adjacent and in a substantially parallel and spaced configuration with said rear end upper member, and wherein said first angle steel upper crossmember and said rear end upper member are welded about an outer periphery of said upper end of said support pillar so as to maintain said upper platform at an angle between 1 and 10 degrees in relation to said lower platform and wherein said upper platform further comprises a second angle steel upper crossmember adapted for welded connection between said first and second side upper members so as to be in a substantially parallel and spaced configuration adjacent with said front end upper member serving as a support for the feet of a welding or similar unit and wherein said lower platform further comprises a rectangular frame having a front and rear end lower member and a first and second side lower member made from at least 3/16 of an inch thick angle steel, and having a channel steel lower crossmember adapted for welded connection between said first and second side lower members so as to be in an adjacent and substantially parallel and spaced configuration with said rear end lower member, and wherein said channel steel lower crossmember is welded about an outer periphery of said lower end of said support pillar and wherein said lower platform further comprises an angle steel lower crossmember adapted for welded connection between said first and second side lower members so as to be in a substantially parallel and spaced configuration with said front end lower member, and wherein said angle steel lower crossmember and said front end lower member serve as mounting points for welding said front caster wheel mounting plates.

3. The bilevel cantilevered platform steel welding cart of claim 2 wherein said lower platform first and second side lower members have orifices defined therein through which said rear wheel axle protrudes.

4. The bilevel cantilevered platform steel welding cart of claim 3 wherein said rear wheel axle is welded to said rear end lower member.

5. The bilevel cantilevered platform steel welding cart of claim 4 wherein said first and second side upper members have at least one hook extending therefrom.

6. The bilevel cantilevered platform steel welding cart of claim 5 wherein said rear gas cylinder stabilizing plate is welded to said rear end upper member and has a vee shaped configuration thereon so as to cradle a gas cylinder and prevent lateral movement thereof.

7. The bilevel cantilevered platform steel welding cart of claim 6 wherein said chain has a first end permanently affixed to said gas cylinder stabilizing plate and a second end that can be temporarily affixed to said gas cylinder stabilizing plate so as to further secure a gas cylinder.

8. The bilevel, adjustable height, cantilevered platform, steel welding cart of claim 7 wherein said telescoping support pillar comprises:
 an inner steel tube;
 an outer steel tube;
 a mechanical fastener; wherein said inner steel tube has an outer diameter that is dimensionally smaller than an inner diameter of said outer steel tube yet allows said tubes to operate in sliding engagement, and wherein said inner steel tube has at least one first orifice therethrough and said outer steel tube has at least one substantial similar second orifice therethrough such that said orifices are alignable and through which said mechanical fastener may pass.

* * * * *